(12) United States Patent
Kato et al.

(10) Patent No.: US 11,904,806 B2
(45) Date of Patent: Feb. 20, 2024

(54) VEHICLE CONTROL SYSTEM, VEHICLE, AND VEHICLE CONTROL METHOD

(71) Applicant: HONDA MOTOR CO., LTD., Tokyo (JP)

(72) Inventors: Hisahiro Kato, Tokyo (JP); Satoshi Hasegawa, Tokyo (JP); Naoto Yamamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/666,571

(22) Filed: Feb. 8, 2022

(65) Prior Publication Data

US 2022/0314929 A1    Oct. 6, 2022

(30) Foreign Application Priority Data

Mar. 30, 2021 (JP) .................................. 2021-058378

(51) Int. Cl.
*B60R 25/021* (2013.01)
*B60R 25/24* (2013.01)
*B60R 25/32* (2013.01)
*H04L 12/40* (2006.01)

(52) U.S. Cl.
CPC ............ *B60R 25/021* (2013.01); *B60R 25/24* (2013.01); *B60R 25/32* (2013.01); *H04L 12/40104* (2013.01); *H04L 2012/40215* (2013.01); *H04L 2012/40273* (2013.01)

(58) Field of Classification Search
CPC ........ B60R 25/021; B60R 25/24; B60R 25/32; B60R 12/40104; B60R 2012/40215; B60R 2012/40273
See application file for complete search history.

(56) References Cited

U.S. PATENT DOCUMENTS

| | | | | |
|---|---|---|---|---|
| 5,074,569 | A * | 12/1991 | Kawabata | B60G 17/017 280/5.514 |
| 7,362,006 | B2 * | 4/2008 | Otani | B60R 25/02144 307/10.3 |
| 2012/0041661 | A1 * | 2/2012 | Kaneko | B60T 1/062 701/70 |
| 2013/0060412 | A1 * | 3/2013 | Nakagawara | B60T 17/221 701/22 |
| 2014/0032074 | A1 * | 1/2014 | Hasegawa | B60T 7/122 701/70 |
| 2016/0225260 | A1 * | 8/2016 | Lin | G08G 1/0965 |
| 2020/0339121 | A1 * | 10/2020 | Jang | B60L 15/2009 |

FOREIGN PATENT DOCUMENTS

| | | |
|---|---|---|
| JP | 5856941 B2 | 2/2016 |
| JP | 5914298 B2 | 5/2016 |

* cited by examiner

*Primary Examiner* — Thomas D Alunkal (57) ABSTRACT

The vehicle control system comprises: a first ECU comprising a processor for receiving first information that indicates whether a vehicle is moving and, based on the first information, generating a first control signal to control locking of a steering; and a second ECU comprising a processor for receiving second information that indicates whether the vehicle is moving and, based on the second information, generating a second control signal to control the locking of the steering, wherein the second ECU outputs a signal to lock the steering based on the first control signal and the second control signal.

20 Claims, 4 Drawing Sheets

VEHICLE CONTROL SYSTEM, VEHICLE, AND VEHICLE CONTROL METHOD

The contents of the following Japanese patent application(s) are incorporated herein by reference:
NO. 2021-058378 filed in JP on Mar. 30, 2021.

BACKGROUND

1. Technical Field

The present invention relates to a vehicle control system, a vehicle, and a vehicle control method.

2. Related Art

Patent Documents 1 and 2 describe the techniques for switching a locked/unlocked state of a steering of a vehicle.
Japanese Patent No. 5914298
Japanese Patent No. 5856941

DESCRIPTION OF EXEMPLARY EMBODIMENTS

While the present invention will be described below by means of embodiments of the invention, these embodiments below are not intended to limit the invention defined by the claims. In addition, all combinations of features set forth in the embodiments are not necessarily essential to the solutions of the present invention.

Figure 1:
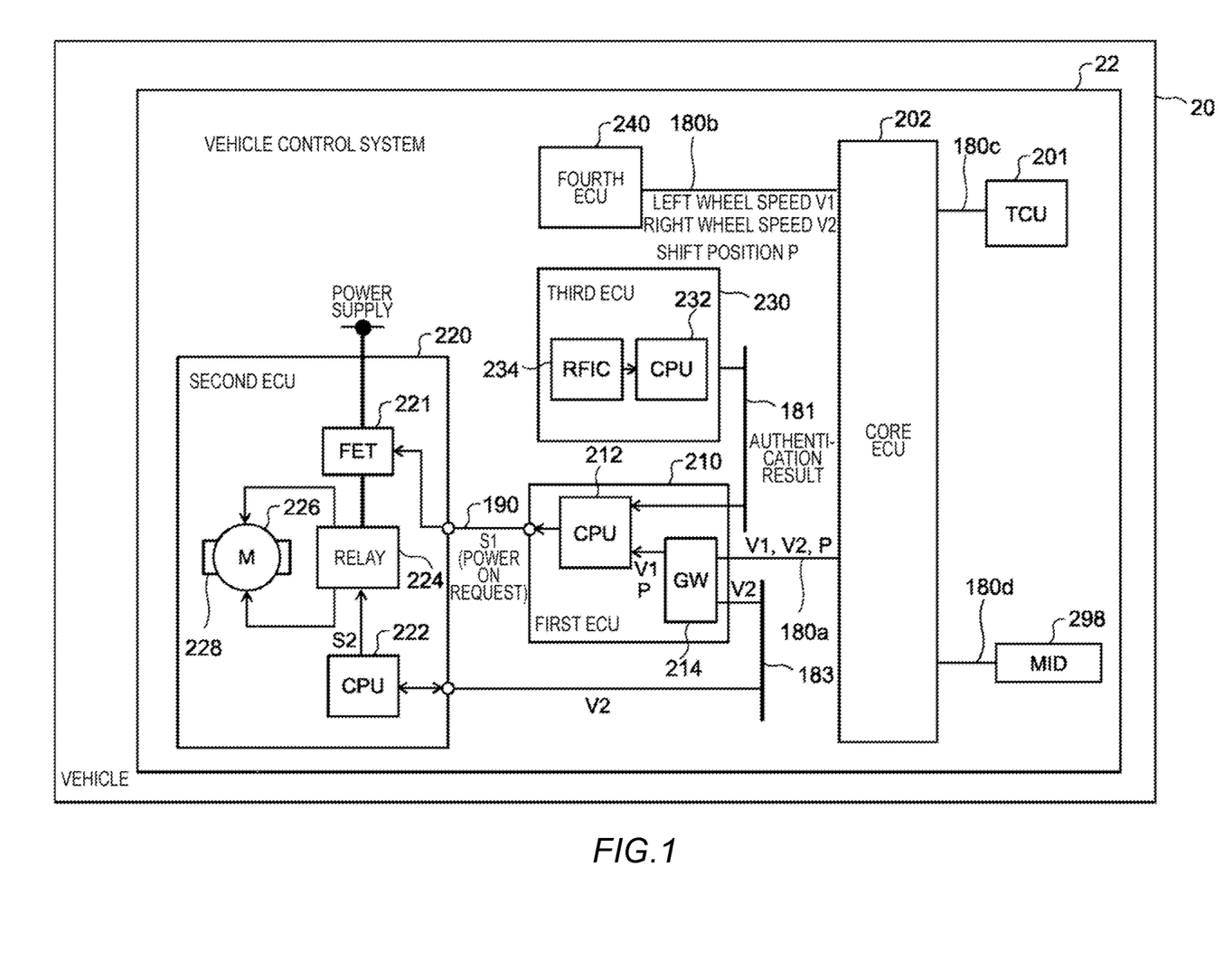
FIG. 1 schematically illustrates a system configuration of a vehicle 20 according to an embodiment.

FIG. 1 schematically illustrates a system configuration of a vehicle 20 according to an embodiment. The vehicle 20 comprises a vehicle control system 22. The vehicle control system 22 comprises a TCU 201, a core ECU 202, a first ECU 210, a second ECU 220, a third ECU 230, a fourth ECU 240, and an MID 298. Note that, while FIG. 1 shows the configuration in which the vehicle 20 comprises the vehicle control system 22, the configuration of the vehicle 20 is not limited to the example of this embodiment.

The core ECU 202, the first ECU 210, the second ECU 220, the third ECU 230, and the fourth ECU 240 are ECUs (Electronic Control Units) that control on-board equipment. Each of the core ECU 202, the first ECU 210, the second ECU 220, the third ECU 230, and the fourth ECU 240 may be configured including a computer comprising a processor, a volatile memory, and a non-volatile memory. The TCU 201 is a TCU (Telematics Control Unit). The TCU 201 is responsible for wireless communication with outside of the vehicle 20. For example, the TCU 201 is responsible for wireless communication through a mobile network or wireless LAN communication.

The core ECU 202 is connected to the first ECU 210 via a communication network 180a. The core ECU 202 and the first ECU 210 are communicable mutually over the communication network 180a. The core ECU 202 is connected to the fourth ECU 240 via a communication network 180b. The core ECU 202 and the fourth ECU 240 are communicable mutually over the communication network 180b. The core ECU 202 is connected to the TCU 201 via a communication network 180c. The core ECU 202 and the TCU 201 are communicable mutually over the communication network 180c. The core ECU 202 is connected to a MID 298 via a communication network 180d. The core ECU 202 and the MID 298 are communicable mutually over the communication network 180d. The core ECU 202 is an ECU that relays communications among the first ECU 210, the second ECU 220, the third ECU 230, the fourth ECU 240, the TCU 201, and the MID 298. The core ECU 202 may also be referred to as a "central ECU," a "master ECU" or the like.

The first ECU 210 is connected to the second ECU 220 via a communication network 183. The communication network 183 is an example of a "third communication network. The core ECU 202 and the second ECU 220 are communicable mutually over the communication network 183. The first ECU 210 is connected to the third ECU 230 via a communication network 181. The first ECU 210 and the third ECU 230 are communicable mutually over the communication network 181.

The first ECU 210 and the second ECU 220 are ECUs related to the control of a steering lock mechanism. The second ECU 220 is an ECU comprising an electric steering lock function. The first ECU 210 outputs a control signal to the second ECU 220. The third ECU 230 is an ECU for performing controls related to a keyless entry, for example. The fourth ECU 240 is an ECU for integral control of the ECUs for performing controls mainly related to driving control of the vehicle 20, such as a motor, an engine, a fuel injector, a braking system, and a shift mechanism, for example.

The communication network 180a, the communication network 180b, the communication network 180c, and the communication network 180d, as well as the communication network 181 and the communication network 183 are CAN (Controller Area Network) communication networks.

The first ECU 210 is connected to the second ECU 220 via a direct line 190. The direct line 190 is a signal line directly connected to each other, not a wiring for data communication such as serial communication. A direct line 190 may be a signal line that transmits an analog signal.

The second ECU 220 comprises an electric steering lock (ESL) function. The second ECU 220 comprises a CPU 222, a relay 224, an FET 221, and a motor 226. The motor 226 moves a locking member 228 for locking a steering between a lock position and a non-lock position. Assume here that normal rotation of the motor 226 moves the locking member 228 from the non-lock position to the lock position, and reverse rotation of the motor 226 moves the locking member 228 from the lock position to the non-lock position. The rotation direction of the motor 226 is switched depending on a polarity of a driving current supplied to the motor 226. The relay 224 switches the polarity of the driving current supplied to the motor 226. Specifically, the relay 224 switches the direction of the current supplied from a power supply via the FET 221 and supplies it to the motor 226 as the driving current. The relay 224 switches the polarity of the driving current supplied to the motor 226 depending on a control signal supplied from the CPU 222. The CPU 222 receives information transmitted from the first ECU 210 over the communication network 183, and generates the control signal based on the received information.

The third ECU 230 comprises a CPU 232 and an RFIC 234. The third ECU 230 is connected to the first ECU 210 by the communication network 181, and receives a locking signal and an unlocking signal through valid owner authentication for the vehicle 20. Moreover, the third ECU 230 outputs a result of the valid owner authentication upon starting up the vehicle 20. The communication network 181 is an example of a "first communication network. The third ECU 230 is a keyless entry ECU, for example. The RFIC 234 is an IC chip having a radio frequency communication function, wherein the IC chip receives a code in the form of a radio signal transmitted from a key, for example, and, if the received code matches a previously stored code, outputs an authentication result to the CPU 232 indicating that the key authentication has been acquired. The CPU 232 transmits information to the first ECU 210 over the communication network 181 about the authentication result indicating that the key authentication has been acquired. The third ECU 230 can ensure double security by the RFIC 234 and the CPU 232.

The first ECU 210 comprises a CPU 212 and a gateway 214. The gateway 214, under control of the CPU 212, transfers a part of information received over the communication network 180a to the communication network 183. The CPU 212 receives information transmitted from the third ECU 230 over the communication network 181. Moreover, the CPU 212 receives at least a part of information transmitted from the fourth ECU 240 over the communication network 180a.

There will be explained about the control relating to a steering lock at the first ECU 210, the second ECU 220, the third ECU 230, and the fourth ECU 240. In the first ECU 210, the CPU 212 receives first information that indicates whether the vehicle 20 is moving. Based on the first information, the CPU 212 generates a first control signal S1 to control locking of the steering. Specifically, the CPU 212 generates the first control signal S1 based on the information received from the third ECU 230 and the first information. In the second ECU 220, the CPU 222 receives second information that indicates whether the vehicle 20 is moving, and, based on the second information, generates a second control signal S2 to control locking of the steering. The second ECU 220 outputs a signal to lock the steering based on the first control signal and the second control signal.

The specific explanation will be provided by means of the example shown in FIG. 1. In the example shown in FIG. 1, the first information includes information on a left wheel speed V1 and a shift position P. The second information includes information on a right wheel speed V2 of the vehicle 20. The left wheel speed may be a speed calculated from a rotational speed of an axle that drives left wheels provided on the vehicle 20. The right wheel speed may be a speed calculated from a rotational speed of an axle that drives right wheels provided on the vehicle 20. The information on the left wheel speed V1, the information on the right wheel speed V2, and the information on the shift position P are information transmitted from the fourth ECU 240 to the first ECU 210. For example, the information on the left wheel speed V1 and the information on the right wheel speed V2 are generated by the ECU for controlling the braking system and transmitted to the fourth ECU 240. Moreover, the information on the shift position P is generated by the ECU for controlling the shift mechanism and transmitted to the fourth ECU 240. The information on the left wheel speed V1, the information on the right wheel speed V2, and the information on the shift position P are transmitted from the fourth ECU 240 to the core ECU 202 over the communication network 180b. The core ECU 202 transfers the information on the left wheel speed V1, the information on the right wheel speed V2, and the information on the shift position P received over the communication network 180b to the communication network 180a. Whereby, the first ECU 210 receives the information on the left wheel speed V1, the information on the right wheel speed V2, and the information on the shift position P.

The CPU 212 in the first ECU 210 generates the first control signal S1 based on the left wheel speed V1, the shift position P, and the information on the authentication result received from the second ECU 220. The first control signal S1 is a power ON request signal for causing power supply to the motor 226. For example, the CPU 212 generates the first control signal S1 as the power ON request signal when the information has been received from the second ECU 220 about the authentication result indicating that the key authentication is acquired, the left wheel speed V1 is 0 (zero), and the shift position P is a parking position.

The first control signal S1 generated through the control by the CPU 212 is input directly into the second ECU 220 through the direct line 190. In the second ECU 220, the first control signal S1 input into the second ECU 220 bring the FET 221 into a conductive state so that the relay 224 can be energized from the power supply.

In the first ECU 210, the gateway 214 transfers the information on the right wheel speed V2 received over the communication network 180a to the communication network 183. The second ECU 220 receives the information on the right wheel speed V2 from the first ECU 210 over the CAN communication network 183. The CPU 222 generates the second control signal S2 based on the information transmitted from the first ECU 210 over the communication network 183. Specifically, the CPU 222 generates the second control signal S2 based on the right wheel speed V2 transmitted from the first ECU 210 over the communication network 183. More specifically, the CPU 222 generates the second control signal S2 to lock the steering when the right wheel speed V2 is 0 (zero). The second control signal S2 is a driving signal to drive the relay 224 so that the driving current is supplied to the motor 226 with the polarity that causes the normal rotation of the motor 226, for example.

According to the vehicle control system 22, the first control signal S1 is generated for driving the FET 221 based on the first information including the left wheel speed V1, and the second control signal S2 is generated based on the right wheel speed V2. As such, the relay 224 can lock the steering only when the left wheel speed V1 is at least 0 and the right wheel speed V2 is at least 0. This can prevent the steering from being locked by the locking member 228 while the vehicle 20 is running Note that, according to the vehicle control system 22, it comprises a configuration to input the information of the right wheel speed V2 directly into the second ECU 220, so that the second ECU 220 by itself can prevent the steering from being locked during the vehicle 20 is running.

Note that the information on the right wheel speed V2, the information on the left wheel speed V1, and the information on the shift position P of the vehicle 20 are desirably generated by a component which has been certified at least of the ASIL (Automotive Safety Integrity Level) B. Moreover, the second control signal S2 is also desirably generated by a component certified of the ASIL B. Whereby, the signal generated by the relay 224 can be made to be an ASIL D signal.

In this embodiment, the first ECU 210 receives the first information and the second information from the core ECU 202 over the communication network 180a, the first ECU 210 transfers the second information received from the communication network 180*a* to the communication network 183 connected to the second ECU 220, and the second ECU 220 receives the second information over the communication network 183. The communication network 180*a*, the communication network 180*b*, and the communication network 183 are the CAN communication networks. As such, the second ECU 220 receives the second information over the CAN communication network. Whereby, the second ECU 220 can receive the information on the right wheel speed V2 transmitted from the fourth ECU 240 over the CAN communication network. As such, as compared to the form in which the information on the right wheel speed V2 is input into the second ECU 220 through a serial signal line, for example, a signal on a CAN bus does not need to be transformed to a serial signal. Accordingly, the second ECU 220 can receive the information on the right wheel speed V2 as is sequentially transmitted from the fourth ECU 240. Moreover, the second ECU 220 can acquire various other information on movement of the vehicle 20 over the CAN communication network. As such, the CPU 222 can output properly the second control signal S2. Note that, as other forms, the second ECU 220 may be connected to the core ECU 202 via a communication network to which the first ECU 210 is not connected, and receive the second information through the core ECU 202.

Note that the first information may include information on the right wheel speed V2 of the vehicle 20, while the second information may include the information on the left wheel speed V1. That is, the first information may include one information among the information on the right wheel speed V2 and the information on the left wheel speed V1 of the vehicle 20, while the second information may include the other information among the information on the right wheel speed V2 and the information on the left wheel speed V1 of the vehicle 20. As other forms, the first information may include one information among (1) information on a wheel speed of the vehicle 20 and (2) information on a wheel speed and vehicle speed of the vehicle 20, while the second information may include the other information among (1) the information on the wheel speed of the vehicle 20 and (2) the information on the wheel speed and vehicle speed of the vehicle 20.

Note that the CPU 212, the CPU 222, and the CPU 232 are execution units of arithmetic processing. The CPU 212 can be one processor core.

Figure 2:
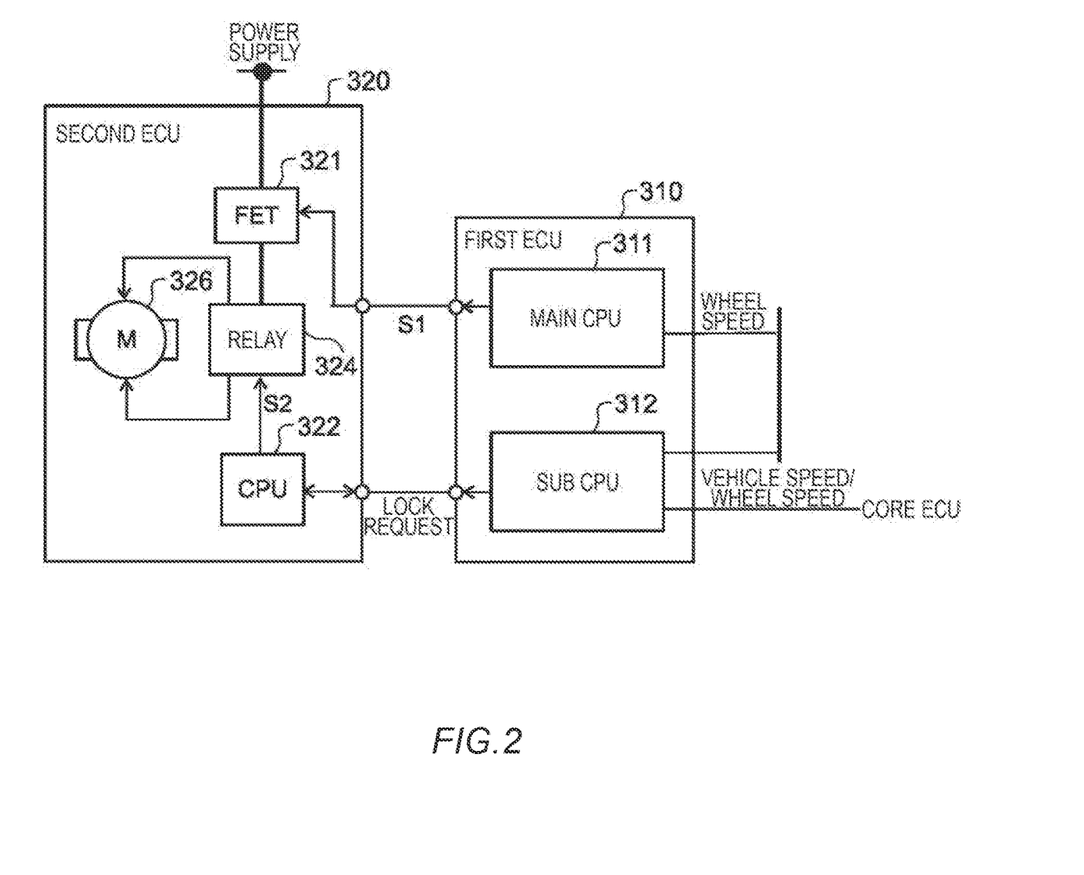
FIG. 2 illustrates a vehicle control system of a first comparative example according to a vehicle control system 22.
Figure 3:
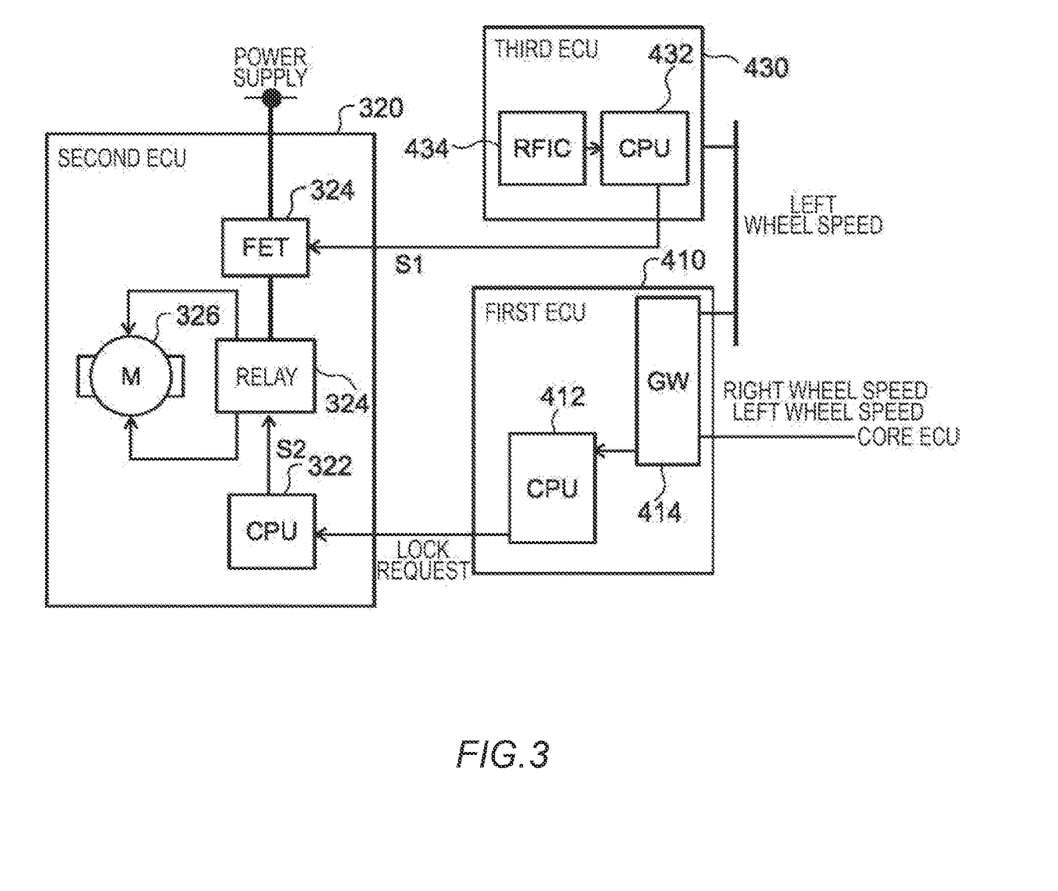
FIG. 3 illustrates a vehicle control system of a second comparative example according to the vehicle control system 22.

According to the vehicle control system 22 described above, the CPU 212 generates the first control signal S1 from first information of the ASIL B indicating the movement of the vehicle 20, and the CPU 222 provided in the second ECU 220 generates the second control signal S2 from second information of the ASIL B indicating the movement of the vehicle 20. Whereby redundancy can be ensured to secure the ASIL D. Furthermore, the CPU 212 in the first ECU 210 processes the information from the second ECU 220 which can be a target of an attack from the outside, so that the CPU 212 can enhance resistance against the attack from the outside. Whereby, a smaller number of CPUs (or processor cores) can be used here to ensure security against the attack from the outside while ensuring the redundancy to secure the ASIL D. With reference to FIG. 2 and FIG. 3, key features of the vehicle control system 22 will be described as compared to comparative examples by referring to the comparative examples according to the vehicle control system 22.

FIG. 2 illustrates a vehicle control system of a first comparative example according to the vehicle control system 22. The vehicle control system of the first comparative example comprises a first ECU 310 and a second ECU 320. The first ECU 310 and the second ECU 320 are components corresponding to the first ECU 210 and the second ECU 220 in the vehicle control system 22. As such, there will be mainly described herein differences from the vehicle control system 22.

The first ECU 310 comprises a main CPU 311 and a sub CPU 312. The sub CPU 312 acquires information on a vehicle speed and a wheel speed from the core ECU. The main CPU 311 receives, as information corresponding to the first information, information from the sub CPU 312 on the wheel speed received by the sub CPU 312. Based on the wheel speed, the main CPU 311 generates the first control signal S1 to lock the steering. The generated first control signal S1 is input into the second ECU 320 through the direct line.

The sub CPU 312 generates, based on the information on the vehicle speed and the wheel speed, a lock request signal to request locking of the steering. The generated lock request signal is transmitted to the second ECU 320 through a communication line such as UART.

The second ECU 320 comprises a CPU 322, a relay 324, an FET 321, and a motor 326. The CPU 322, the relay 324, the FET 321, and the motor 326 are components respectively corresponding to the CPU 222, the relay 224, the FET 221, and the motor 226 of the second ECU 220. As such, there will be mainly described herein differences from the second ECU 220.

The CPU 322 generates, upon reception of a lock request generated by the sub CPU 312, a second control signal S2 to control locking of the steering. The generated second control signal S2 is input into the relay 324. As with the FET 221, the FET 321 is brought into a conductive state by the first control signal S1 input into the second ECU 220, so that the relay 224 can be energized from the power supply. As with the relay 224, the relay 324 supplies the driving current to drive the motor 326 based on the second control signal S2.

The vehicle control system of the first comparative example can also make the driving signal for the motor 326 generated by the relay 324 to be the ASIL D signal, by making the vehicle speed, the wheel speed, the first control signal S1, the lock request, and the second control signal S2 to be the ASIL B signals. However, in the vehicle control system 22 described referring to FIG. 1, the first ECU 210 and the second ECU 220 comprises two CPUs, whereas the vehicle control system of the first comparative example requires three CPUs (or three processor cores). As such, employing the configuration of the vehicle control system of the first comparative example will increase the cost as compared to employing the configuration of the first ECU 210 and the second ECU 220 in the vehicle control system 22.

FIG. 3 illustrates a vehicle control system of a second comparative example according to the vehicle control system 22. The vehicle control system of the second comparative example comprises a first ECU 410, a second ECU 320, and a third ECU 430. The first ECU 310 and the third ECU 430 are components corresponding to the first ECU 210 and the third ECU 230 in the vehicle control system 22. A CPU 432 and an RFIC 434 in the third ECU 430 comprises similar functions as those of the CPU 232 and the RFIC 234. As such, there will be mainly described herein differences from the vehicle control system 22 and the vehicle control system of the first comparative example.

The first ECU 410 comprises a CPU 412 and a gateway 414. The CPU 412 receives the right wheel speed transmitted through the core ECU and generates the lock request signal based on the right wheel speed. As with the vehicle control system of the first comparative example, the lock request signal generated by the CPU 412 is input into the CPU 322 in the second ECU 320 to generate the second control signal S2.

The gateway 414 transfers the information on the left wheel speed received from the core ECU to the third ECU 430. In the third ECU 430, the CPU 432 generates the first control signal S1 based on the left wheel speed. The first control signal S1 generated by the CPU 432 is input into the second ECU 320.

The vehicle control system of the second comparative example can also make the driving signal for the motor 326 generated by the relay 324 to be the ASIL D signal, by making the right wheel speed, the left wheel speed, the first control signal S1, the lock request, and the second control signal S2 to be the ASIL B signals. Moreover, the number of CPUs required for the vehicle control system of the second comparative example equals to the number of CPUs required for the vehicle control system. However, the vehicle control system of the second comparative example has a configuration in which the third ECU 430 generates the first control signal S1 to input it into the second ECU 320. However, the third ECU 430 can be a target of an attack from the outside. As such, the vehicle control system of the second comparative example will decrease the security level of the first control signal S1. In contrast, according to the vehicle control system 22 described referring to FIG. 1, the information generated by the third ECU 230 is not input directly into the second ECU 220. As such, according to the vehicle control system 22 described referring to FIG. 1, the security level will be increased as compared to the vehicle control system of the second comparative example.

Note that employing a configuration wherein the second ECU 220 of the vehicle control system 22 further comprises, in addition to the CPU 222, a CPU that receives ASIL B information on the left wheel speed, as a fourth comparative example according to the vehicle control system 22, can ensure security against the attack to the second ECU 220 while making the driving signal for the motor 326 to be the ASIL D signal. However, this configuration requires one more CPUs than those in the vehicle control system 22, so that the cost cannot be reduced as compared to the vehicle control system 22.

As described above, according to the vehicle control system 22, the CPU 212 in the first ECU 210 processes the information from the second ECU 220 that can be a target of an attack from the outside, allowing security to be ensured against the attack from the outside. In addition, the CPU 212 in the first ECU 210 generates the first control signal S1 from ASIL B information indicating the movement of the vehicle 20, while the CPU 222 provided in the second ECU 220 generates the second control signal S2 from other ASIL B information relating to the movement of the vehicle 20. As such, a smaller number of CPUs (or processor cores) can be used to ensure security against the attack from the outside while ensuring the redundancy to secure the ASIL D. As such, the highly safe vehicle control system can be provided at low cost.

Note that, in the vehicle control system 22, the connection configuration of the first ECU 210, the second ECU 220, and the third ECU 230 is applicable to various architectures of the vehicle. While the embodiment above describes the form wherein the third ECU 230 performs the certification relating to the electric steering lock mechanism and the first ECU 210 and the second ECU 220 perform the lock control, the form is applicable wherein the third ECU 230 performs user certification relating to an unlocking mechanism of an immobilizer and the first ECU 210 and the core ECU 202 perform unlock control of the immobilizer. Note that the form is also applicable wherein the first ECU 210 and the fourth ECU 240 perform the unlock control of the immobilizer. Moreover, the form can also be employed wherein the first ECU 210 receives information relating to the movement of the vehicle 20 over the CAN communication network or the like, not via the core ECU 202, from a fuel injector or the like.

The vehicle 20 is a vehicle as an example of transportation equipment. The vehicle may be an automobile such as an automobile comprising an internal combustion engine, an electric vehicle, and a fuel cell vehicle (FCV). The automobile includes, e.g., a bus, a truck, and a two-wheeled vehicle. The vehicle may be a saddle type vehicle or the like, and may be a motorcycle. The transportation equipment includes, aside from the vehicle, equipment such as an aircraft including an unmanned aircraft, and a ship. The transportation equipment may be any equipment for transporting people or items. The transportation equipment is an example of the mobile object. The mobile object is not limited to the transportation equipment but may be any movable equipment.

Figure 4:
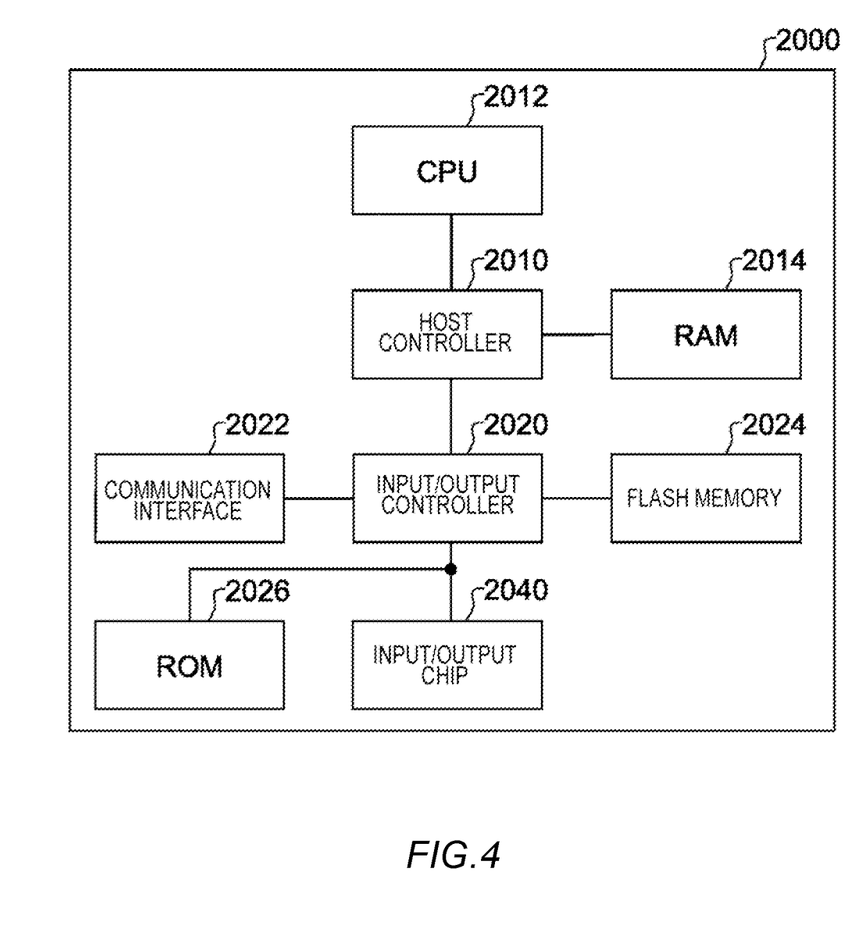
FIG. 4 illustrates an example of a computer 2000.

FIG. 4 shows an exemplary computer 2000 in which some embodiments of the present invention may be wholly or partially embodied. A program installed in the computer 2000 can cause the computer 2000 to function as a system such as a vehicle control system or each part of the system or an apparatus such as an information processing apparatus or each part the apparatus according to the embodiments, perform operations associated with the system or each part of the system or the apparatus or each part of the apparatus, and/or perform a process or steps of the process according to the embodiments. Such a program may be executed by a CPU 2012 to cause the computer 2000 to perform specific operations associated with some or all of blocks in the processing procedures and block diagrams described in the specification.

The computer 2000 according to this embodiment includes the CPU 2012 and a RAM 2014, which are connected to each other by a host controller 2010. The computer 2000 also includes a ROM 2026, a flash memory 2024, a communication interface 2022, and an I/O chip 2040. The ROM 2026, the flash memory 2024, the communication interface 2022, and the I/O chip 2040 are connected to the host controller 2010 via an I/O controller 2020.

The CPU 2012 operates in accordance with programs stored in the ROM 2026 and the RAM 2014, thereby controlling each unit.

The communication interface 2022 communicates with other electronic devices via a network. The flash memory 2024 stores a program and data used by the CPU 2012 in the computer 2000. The ROM 2026 stores a boot program or the like executed by the computer 2000 upon activation, and/or a program dependent on hardware of the computer 2000. The I/O chip 2040 may also connect various I/O units, such as a keyboard, a mouse, and a monitor, to the I/O controller 2020 via I/O ports, such as a serial port, a parallel port, a keyboard port, a mouse port, a monitor port, an USB port, and an HDMI (registered trademark) port.

The program is provided via a computer-readable storage medium, such as a CD-ROM, a DVD-ROM, or a memory card, or via a network. The RAM 2014, the ROM 2026, or the flash memory 2024 are examples of the computer-readable storage medium. The program is installed in the flash memory 2024, the RAM 2014, or the ROM 2026, and executed by the CPU 2012. Information processing described in such a program is read by the computer 2000 to link the program with the various types of hardware resources as mentioned above. The apparatus or method may be configured by embodying the information operation or processing using the computer 2000.

For example, upon performing the communication between the computer 2000 and an external device, the CPU 2012 may execute a communication program loaded in the RAM 2014 and, based on the processing described in the communication program, instruct the communication interface 2022 to perform communication processing. The communication interface 2022, under control of the CPU 2012, reads transmission data stored in a transmission buffer processing area provided in a recording medium such as the RAM 2014 and the flash memory 2024, transmits the read transmission data to the network, and writes the received data received from the network in a reception buffer processing area or the like provided on a recording medium.

In addition, the CPU 2012 may allow the RAM 2014 to read all or necessary parts of a file or database stored in the recording medium such as the flash memory 2024, and perform various types of processing for the data stored on the RAM 2014. The CPU 2012 then writes back the processed data in the recording medium.

Various types of information such as various types of programs, data, tables, and databases may be stored in the recording medium for information processing. On the data read from the RAM 2014, the CPU 2012 may perform various types of processing including various types of operations, information processing, condition determination, conditional branching, unconditional branching, and information retrieval/conversion or the like, which are described in the specification and specified by an instruction sequence of the program, and writes back the results in the RAM 2014. The CPU 2012 may also retrieve information in a file, database, or the like in the recording medium. For example, when the recording medium stores a plurality of entries each having an attribute value of a first attribute associated with an attribute value of a second attribute, the CPU 2012 may retrieve an entry from the plurality of entries that matches a condition in which the attribute value of the first attribute is specified, and read the attribute value of the second attribute stored in the entry, thereby acquiring the attribute value of the second attribute associated with the first attribute that satisfies a predetermined condition.

The programs or software modules described above may be stored in the computer-readable storage medium on the computer 2000 or in the vicinity of the computer 2000. A recording medium such as a hard disk or a RAM provided in a server system connected to a dedicated communication network or the Internet is usable as the computer-readable storage medium. The program stored in the computer-readable storage medium may be provided to the computer 2000 via the network.

The program installed in the computer 2000 and causes the computer 2000 to function as the first ECU 210 may operate on the CPU 2012 or the like to cause the computer 2000 to function as each part of the first ECU 210. The information processing described in these programs are read in the computer 2000, thereby functioning as each part of the first ECU 210 which serves as specific means under cooperation of the software and the various types of hardware resources as described above. In addition, these specific means embody arithmetic operation or processing of information depending on purpose of use of the computer 2000 in this embodiment to establish the first ECU 210 specific to the purpose of use.

The program installed in the computer 2000 and causes the computer 2000 to function as the second ECU 220 may operate on the CPU 2012 or the like to cause the computer 2000 to function as each part of the second ECU 220. The information processing described in these programs are read in the computer 2000, thereby functioning as each part of the second ECU 220 which serves as specific means under cooperation of the software and the various types of hardware resources as described above. In addition, these specific means embody arithmetic operation or processing of information depending on purpose of use of the computer 2000 in this embodiment to establish the second ECU 220 specific to the purpose of use.

Various embodiments have been described with reference to the block diagrams or the like. In the block diagrams, each block may represent: (1) a step of a process for performing an operation; or (2) each part of an apparatus having a function to perform an operation. A specific step or each part may be implemented by a dedicated circuit, a programmable circuit provided along with computer-readable instructions stored on a computer-readable storage medium, and/or a processor provided along with the computer-readable instructions stored on the computer-readable storage medium. The dedicated circuit may include a digital and/or analog hardware circuit, or may include an integrated circuit (IC) and/or a discrete circuit. The programmable circuit may include a reconfigurable hardware circuit, including, e.g., logic operations such as logic AND, logic OR, logic XOR, logic NAND, logic NOR, and the like, as well as memory elements such as a flip-flop, a register, a field programmable gate array (FPGA), a programmable logic array (PLA), and the like.

The computer-readable storage medium may include any tangible device that can store instructions to be performed by a suitable device, so that the computer-readable storage medium having the instructions stored therein constitutes at least a part of a product containing the instructions that can be executed to provide means for performing the operations specified in the processing procedures or block diagrams. Examples of the computer-readable storage medium may include an electronic storage medium, a magnetic storage medium, an optical storage medium, a magneto-electric storage medium, a semiconductor storage medium, and the like. More specific examples of the computer-readable storage medium may include a floppy (registered trademark) disk, a diskette, a hard disk, random access memory (RAM), read-only memory (ROM), erasable programmable read-only memory (EPROM or flash memory), electrically-erasable programmable read-only memory (EEPROM), static random access memory (SRAM), compact disc read-only memory (CD-ROM), a digital versatile disk (DVD), a Blu-ray (registered trademark) disk, a memory stick, and an integrated circuit card, or the like.

The computer-readable instructions may include assembler instructions, instruction set architecture (ISA) instructions, machine instructions, machine-dependent instructions, microcodes, firmware instructions, state setting data, or any of source codes or object codes described in any combination of one or more programming languages, including object-oriented programming languages, such as Smalltalk (registered trademark), JAVA (registered trademark), or C++, and conventional procedural programming languages, such as C programming languages or similar programming languages.

The computer-readable instructions are provided to processors or programmable circuits of general-purpose computers, special-purpose computers, or other programmable data processing apparatuses, locally or via a local area network (LAN) or a wide area network (WAN) such as the Internet, wherein the computer-readable instructions may be executed to provide means for performing the operations specified in the described processing procedures or block diagrams. Examples of the processors include a computer processor, a processing unit, a microprocessor, a digital signal processor, a controller, a microcontroller, and the like.

While the embodiments of the present invention have been described, the technical scope of the present invention is not limited to the scope described in the above embodiments. It is apparent to persons skilled in the art that various alterations and improvements can be added to the above-described embodiments. It is also apparent from the description of the claims that the embodiments added with such alterations or improvements can be included in the technical scope of the present invention.

Each processing of the operations, procedures, steps, stages, and the like performed by the apparatus, system, program, and method illustrated in the claims, specification, and diagrams can be embodied in any order unless the execution order is explicitly specified by terms "prior to," "before," or the like and unless the output from a previous process is used in a later process. Even if the operational flow is described using terms "first," "next," or the like in the claims, specification, and diagrams, it does not necessarily mean that the flow must be performed in that order.

EXPLANATION OF REFERENCES

20: vehicle; 22: vehicle control system; 180, 181, 183: communication network; 190: direct line; 201: TCU; 202: core ECU; 210: first ECU; 212: CPU; 214: gateway; 220: second ECU; 221: FET; 222: CPU; 224: relay; 226: motor; 228: locking member; 230: third ECU; 232: CPU; 234: RFIC; 240: fourth ECU; 298: MID; 310: first ECU; 311: main CPU; 312: sub CPU; 320: second ECU; 321: FET; 322: CPU; 324: relay; 326: motor; 410: first ECU; 412: CPU; 414: gateway; 430: third ECU; 432: CPU; 434: RFIC; 2000: computer; 2010: host controller; 2012: CPU; 2014: RAM; 2020: I/O controller; 2022: communication interface; 2024: flash memory; 2026: ROM; 2040: I/O chip

What is claimed is:

1. A vehicle control system comprising:
a first ECU comprising a processor for receiving first information that indicates whether a vehicle is moving and, based on the first information, generating a first control signal to control locking of a steering; and
a second ECU comprising a processor for receiving second information that indicates whether the vehicle is moving and, based on the second information, generating a second control signal to control the locking of the steering, wherein the second ECU being configured to output a signal to lock the steering based on the first control signal and the second control signal,
wherein the first control signal is a power ON request signal for causing power supply to allow locking or unlocking of the steering, and
wherein the second control signal is a driving signal to drive the locking or the unlocking of the steering based on the second information.

2. The vehicle control system according to claim 1, further comprising:

a third ECU connected to the first ECU by a first communication network and configured to receive a locking signal and an unlocking signal through valid owner authentication for the vehicle,
wherein the first ECU generates the first control signal based on information received from the third ECU and the first information.

3. The vehicle control system according to claim 1, wherein:
the first information includes one information among information on a right wheel speed and information on a left wheel speed of the vehicle, and
the second information includes another information among the information on the right wheel speed and the information on the left wheel speed of the vehicle.

4. The vehicle control system according to claim 1, wherein:
the first information includes one information among (1) information on a wheel speed of the vehicle and (2) information on a wheel speed and vehicle speed of the vehicle, and
the second information includes an other information among (1) the information on the wheel speed of the vehicle and (2) the information on the wheel speed and vehicle speed of the vehicle.

5. The vehicle control system according to claim 3, wherein:
the first information further includes information on a shift position of a shift lever.

6. The vehicle control system according to claim 1, wherein:
the first ECU is connected to a core ECU via a second communication network,
the first ECU receives the first information and the second information from the core ECU over the second communication network, and
the first ECU transfers the second information received from the second communication network to a third communication network connected to the second ECU, and the second ECU receives the second information over the third communication network.

7. The vehicle control system according to claim 6, wherein:
the first ECU generates the first control signal based on information received from a third ECU, which receives a locking signal and an unlocking signal through valid owner authentication for the vehicle, and the first information.

8. The vehicle control system according to claim 1, wherein:
the second ECU is connected to a Controller Area Network communication network (CAN communication network) and receives the second information over the CAN communication network.

9. The vehicle control system according to claim 8, wherein:
the second ECU receives the second information from the first ECU over the CAN communication network.

10. The vehicle control system according to claim 2, wherein:
the first information includes one information among information on a right wheel speed and information on a left wheel speed of the vehicle, and
the second information includes another information among the information on the right wheel speed and the information on the left wheel speed of the vehicle.

11. The vehicle control system according to claim 2, wherein:
the first information includes one information among (1) information on a wheel speed of the vehicle and (2) information on a wheel speed and vehicle speed of the vehicle, and
the second information includes another information among (1) the information on the wheel speed of the vehicle and (2) the information on the wheel speed and vehicle speed of the vehicle.

12. The vehicle control system according to claim 4, wherein:
the first information further includes information on a shift position of a shift lever.

13. The vehicle control system according to claim 10, wherein:
the first information further includes information on a shift position of a shift lever.

14. The vehicle control system according to claim 11, wherein:
the first information further includes information on a shift position of a shift lever.

15. The vehicle control system according to claim 2, wherein:
the first ECU is connected to a core ECU via a second communication network,
the first ECU receives the first information and the second information from the core ECU over the second communication network, and
the first ECU transfers the second information received from the second communication network to a third communication network connected to the second ECU, and the second ECU receives the second information over the third communication network.

16. The vehicle control system according to claim 3, wherein:
the first ECU is connected to a core ECU via a second communication network,
the first ECU receives the first information and the second information from the core ECU over the second communication network, and
the first ECU transfers the second information received from the second communication network to a third communication network connected to the second ECU, and the second ECU receives the second information over the third communication network.

17. The vehicle control system according to claim 15, wherein:
the first ECU generates the first control signal based on information received from the third ECU and the first information.

18. The vehicle control system according to claim 16, wherein:
the first ECU generates the first control signal based on information received from a third ECU, which receives a locking signal and an unlocking signal through valid owner authentication for the vehicle, and the first information.

19. A vehicle comprising the vehicle control system according to claim 1.

20. A vehicle control method comprising:
by a processor provided in a first ECU, receiving first information that indicates whether a vehicle is moving and, based on the first information, generating a first control signal to control locking of a steering;
by a processor provided in a second ECU, receiving second information that indicates whether the vehicle is moving and, based on the second information, generating a second control signal to control the locking of the steering; and
by the second ECU, outputting a signal to lock the steering based on the first control signal and the second control signal,
wherein the first control signal is a power ON request signal for causing power supply to allow locking or unlocking of the steering, and
wherein the second control signal is a driving signal to drive the locking or the unlocking of the steering based on the second information.

* * * * *